United States Patent
Jiyama et al.

(10) Patent No.: US 8,947,381 B2
(45) Date of Patent: Feb. 3, 2015

(54) DISPLAY DEVICE

(75) Inventors: Motoya Jiyama, Kobe (JP); Naoki Sugamoto, Kobe (JP); Nobuyuki Batou, Kobe (JP); Kiyoshi Hamatani, Kobe (JP); Kohji Miyazato, Kobe (JP); Hiroyuki Yanai, Kobe (JP); Sadaharu Yamamoto, Osaka (JP); Eiji Umetsu, Nigata-ken (JP); Shuji Yanagi, Nigata-ken (JP); Masahiko Ishizone, Nigata-ken (JP)

(73) Assignees: Fujitsu Ten Limited, Kobe-Shi (JP); Alps Electric Co., Ltd., Tokyo (JP)

( * ) Notice: Subject to any disclaimer, the term of this patent is extended or adjusted under 35 U.S.C. 154(b) by 119 days.

(21) Appl. No.: 13/405,829

(22) Filed: Feb. 27, 2012

(65) Prior Publication Data
US 2012/0223900 A1    Sep. 6, 2012

(30) Foreign Application Priority Data

Mar. 1, 2011  (JP) ................. 2011-044480

(51) Int. Cl.
*G06F 3/041* (2006.01)
(52) U.S. Cl.
CPC .............. *G06F 3/041* (2013.01); *G06F 3/0414* (2013.01); *G06F 3/0418* (2013.01); *G06F 2203/04106* (2013.01)
USPC ........................................................ 345/173
(58) Field of Classification Search
CPC ...................................................... G06F 3/041
USPC ........................................................ 345/173
See application file for complete search history.

(56) References Cited

U.S. PATENT DOCUMENTS

| | | | |
|---|---|---|---|
| 6,202,024 B1 * | 3/2001 | Yokoyama et al. | 701/420 |
| 2006/0109252 A1 * | 5/2006 | Kolmykov-Zotov et al. | 345/173 |
| 2006/0232378 A1 * | 10/2006 | Ogino et al. | 340/5.62 |
| 2008/0289887 A1 * | 11/2008 | Flint et al. | 178/18.03 |
| 2011/0141066 A1 | 6/2011 | Shimotani et al. | |
| 2011/0266760 A1 * | 11/2011 | Itabashi | 280/5.507 |

FOREIGN PATENT DOCUMENTS

| | | |
|---|---|---|
| JP | A 03-280814 | 10/2003 |
| JP | A 2005-526337 | 9/2005 |
| JP | A 2005-331331 | 12/2005 |
| JP | A-2006-126997 | 5/2006 |
| JP | A 2007-139595 | 6/2007 |
| JP | A 2007-155504 | 6/2007 |
| JP | A-2008-16053 | 1/2008 |
| WO | WO 03/100716 A1 | 12/2003 |
| WO | WO 2010/064389 A1 | 6/2010 |

OTHER PUBLICATIONS

Aug. 26, 2014 Office Action issued in Japanese Patent Application No. 2011-044480 (with translation).

* cited by examiner

*Primary Examiner* — Abbas Abdulselam
*Assistant Examiner* — Shawna Stepp Jones
(74) *Attorney, Agent, or Firm* — Oliff PLC

(57) ABSTRACT

A display device according to an embodiment includes a touch panel, a plurality of detecting units, a blocking unit, and a calculating unit. The display device is incorporated in a vehicle, and the touch panel receives a pressing operation. The plurality of detecting units detect a pressure value on the touch panel.

14 Claims, 8 Drawing Sheets

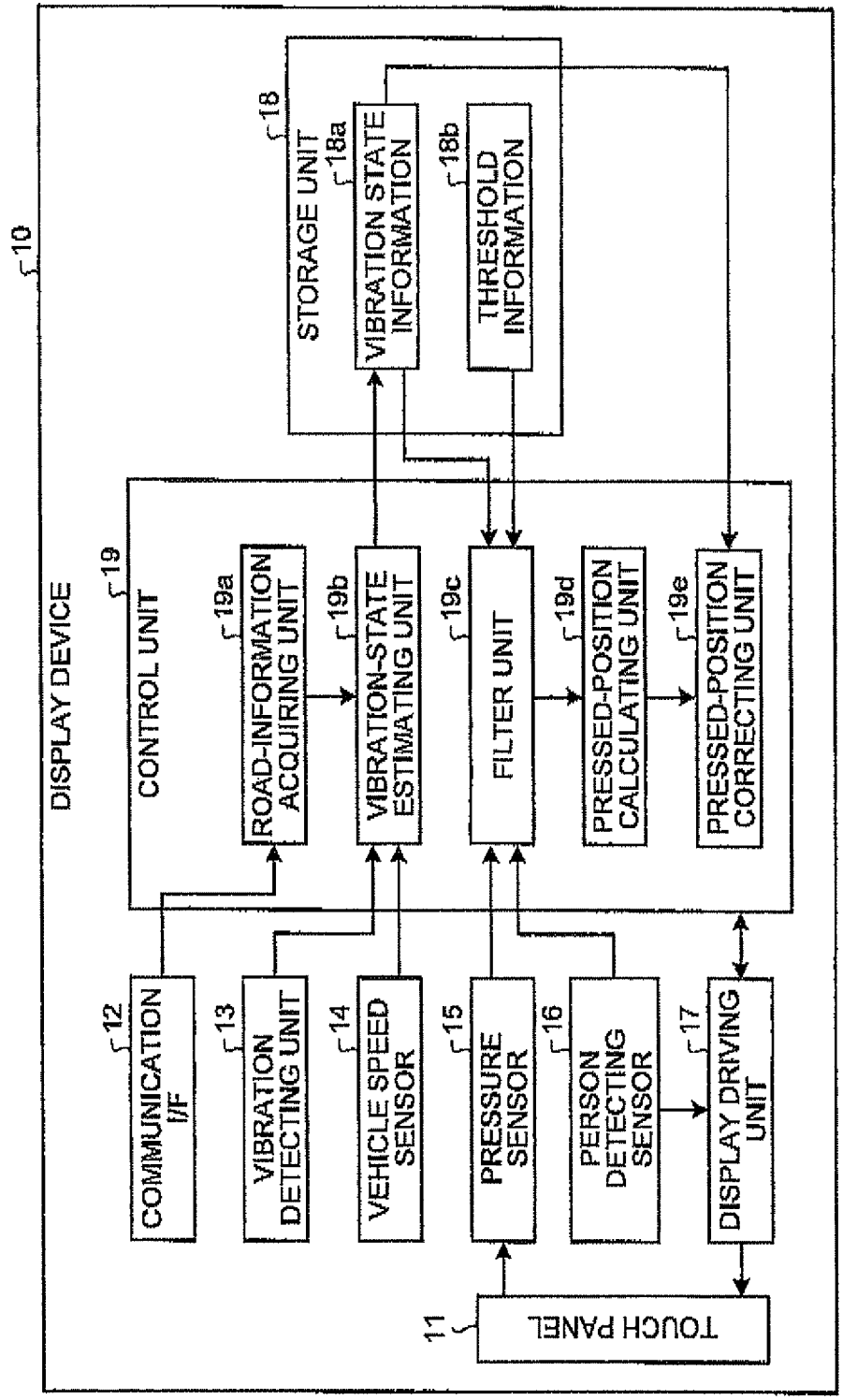

FIG.3A

| VIBRATION LEVEL | CUTOFF FREQUENCY | ... |
|---|---|---|
| HIGH | f1 | |
| LOW | f2 | |
| ⋮ | ⋮ | |

FIG.3B

| VIBRATION LEVEL | CUTOFF FREQUENCY | CONTINUED TIME | UPPER-LIMIT THRESHOLD | LOWER-LIMIT THRESHOLD | ... |
|---|---|---|---|---|---|
| HIGH | f1 | t3 | Pmax1 | Pmin1 | |
| LOW | f2 | t4 | Pmax2 | Pmin2 | |
| ⋮ | ⋮ | ⋮ | ⋮ | ⋮ | |

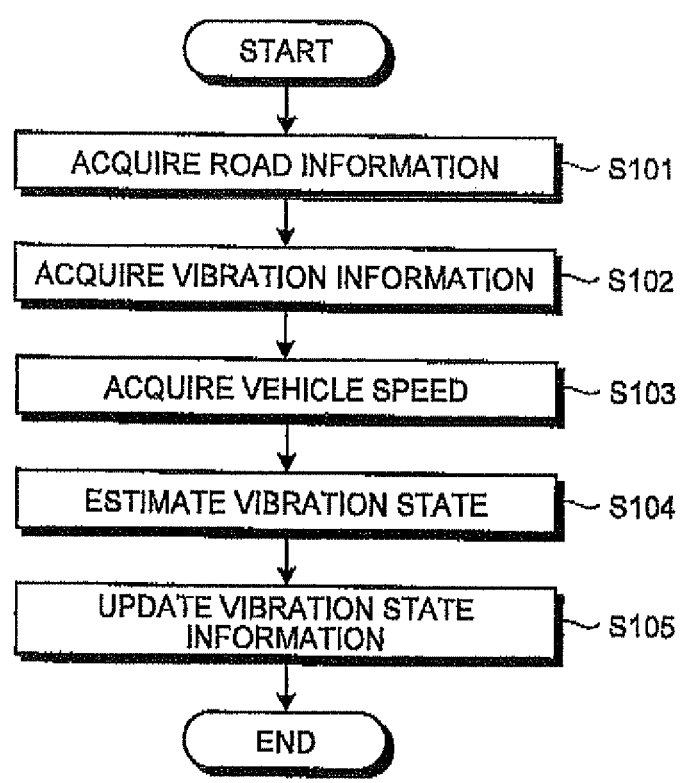

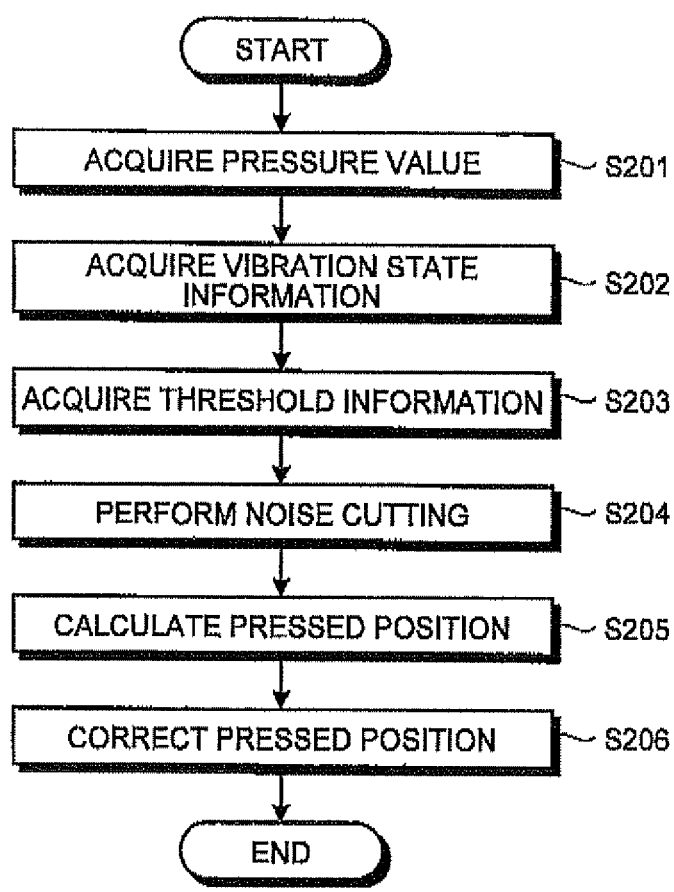

DISPLAY DEVICE

CROSS-REFERENCE TO RELATED APPLICATION

This application is based upon and claims the benefit of priority of the prior Japanese Patent Application No. 2011-044480, filed on Mar. 1, 2011; the entire contents of which are incorporated herein by reference.

FIELD

The embodiments disclosed herein are related to a display device.

BACKGROUND

Conventionally, there have been known display devices having a touch panel that receives input operations. In such type of display devices, a pressed position on the touch panel can be detected by various systems, such as a pressure sensitive system that senses a pressure and reacts to it, and an electrostatic capacitance system that reacts to a change of an electrostatic capacitance between a finger and a conductive film.

Regarding such type of display devices, for example, there has been disclosed a pressure sensitive touch panel that calculates a pressed position based on a pressure value detected by a pressure sensor arranged at the four corners of a back face of the touch panel.

Japanese Patent Application Laid-open No. 2006-126997 is an example of documents related to the above conventional techniques.

However, in the conventional techniques, there has been a problem that, when a pressure sensitive touch panel is applied to a display device incorporated in a vehicle, the display device occasionally makes an erroneous detection such that a position different from a pressed position intended by an operator is detected as the pressed position.

Furthermore, in a pressure sensitive touch panel incorporated in a vehicle, there has been another problem that, even when an operator is not performing any pressing operation, an erroneous detection is made such that a pressing operation has been performed due to an effect of vibrations of the vehicle.

Due to the above problems, there has been an important issue as to how to realize a display device capable of preventing erroneous detections of a pressing operation caused by vibrations of a vehicle as well as erroneous detections of a pressed position.

SUMMARY

A display device according to an embodiment includes a touch panel, a plurality of detecting units, a blocking unit, and a calculating unit. The display device is incorporated in a vehicle, and the touch panel receives a pressing operation. The plurality of detecting units detect a pressure value on the touch panel.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 2 is a block diagram of a configuration of a display device according to the embodiment;

FIGS. 3A and 3B are an example of threshold information;

FIG. 7 is a flowchart of an outline of a vibration-state-estimation process procedure; and FIG. 8 is a flowchart of an outline of a pressed-position-calculation process procedure.

DESCRIPTION OF EMBODIMENT

Exemplary embodiments of a robot system disclosed by the present application will be explained below in detail with reference to the accompanying drawings. The present embodiment is not limited to examples of the following embodiments.

Figure 1A:
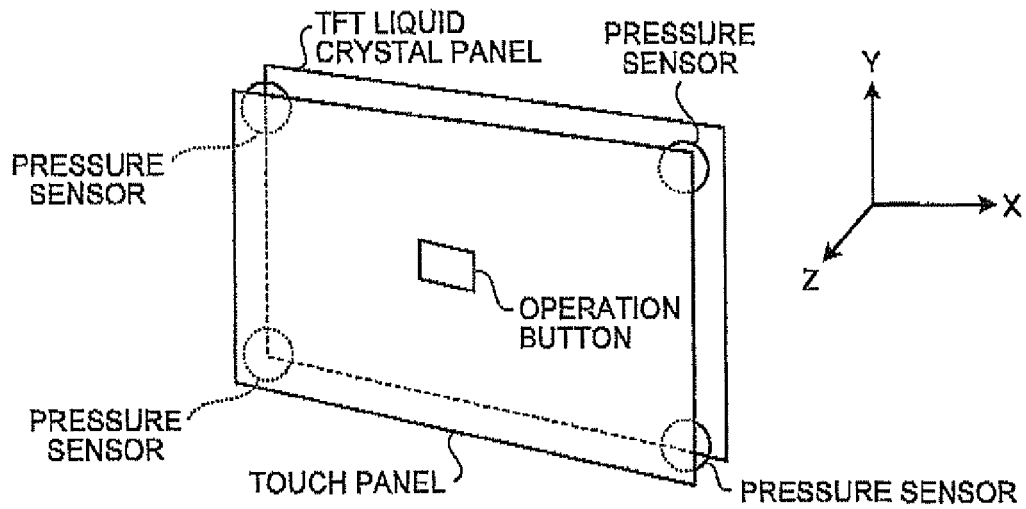
FIGS. 1A to 1C depict an outline of a display device according to an embodiment of the present embodiment.
Figure 1B:
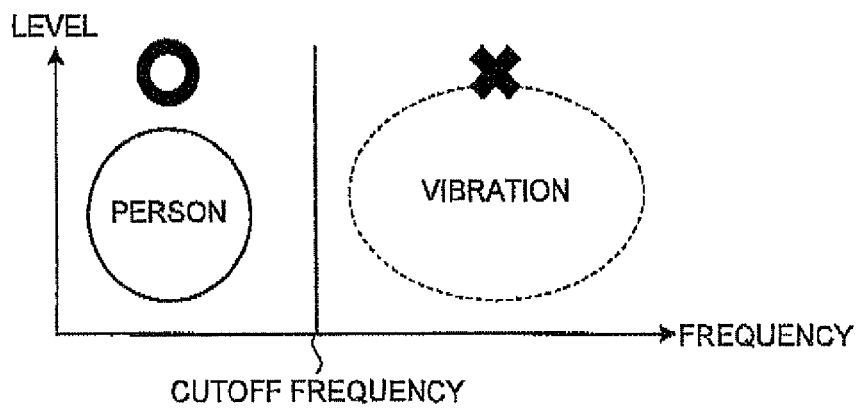
Figure 1C:
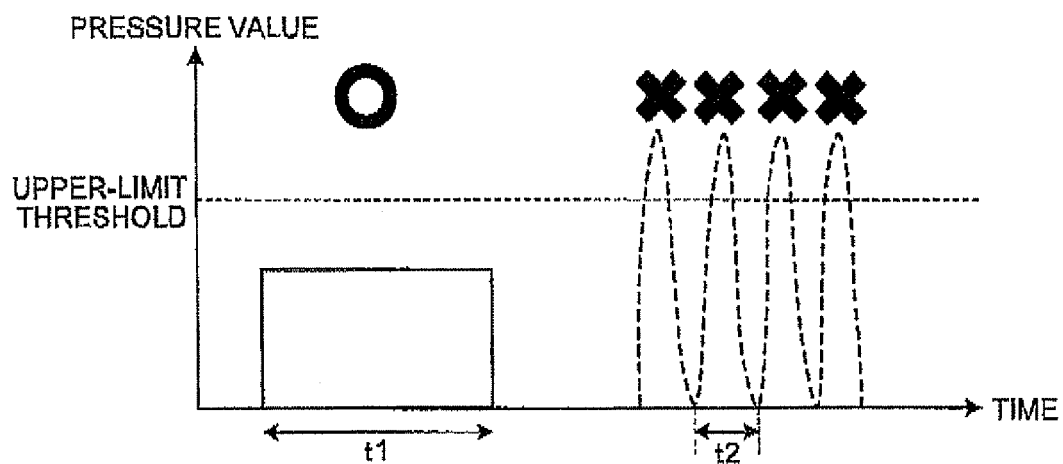

An outline of a display device according to an embodiment of the present embodiment is explained first with reference to FIGS. 1A to 1C. Thereafter, modes of the display device according to the embodiment are explained with reference to FIGS. 2 to 8.

FIGS. 1A to 1C depict an outline of the display device according to the present embodiment. The display device according to the present embodiment develops respective pressure values detected by a plurality of pressure sensors to a frequency axis to attenuate a frequency band caused by vibrations of a vehicle, thereby cutting a noise. In this explanation, the noise represents a fluctuation of pressure values caused by vibrations of a running vehicle.

Subsequently, the display device calculates a pressed position based on the respective pressure values that have been noise-cut. Therefore, the feature of preventing erroneous detections of a pressing operation caused by vibrations of a vehicle as well as erroneous detections of a pressed position even when the display device is incorporated in a vehicle is the main characteristic of the display device according to the present embodiment.

The display device is explained first by the perspective view shown in FIG. 1A. FIG. 1A depicts the display device as viewed from its upper right side. Explanations are given below while referring to the coordinate axes shown on the right side of FIG. 1A.

As shown in FIG. 1A, a pressure sensor is provided at the four corners of at a back face of a front panel, which is included in the display device incorporated in a vehicle and receives pressing operations, and various operation buttons are displayed on a TFT (Thin Film Transistor) liquid crystal panel for display, which is provided while sandwiching the four pressure sensors.

The display device then calculates a pressed position based on all the pressure values detected by the four pressure sensors. When a vehicle is running, each of the sensors detects not only a pressure value due to a pressing operation by a person but also a pressure value due to an effect of vibrations of the vehicle. Accordingly, the display device makes an erroneous detection such that a position different from a pressed position intended by an operator is detected as the pressed position.

For example, the display device may make an erroneous detection such that a pressing operation has been performed by detecting a pressure value due to vibrations of a vehicle, even though any pressing operation has not been actually performed. Furthermore, even when there is a pressing operation by a person, the display device makes an erroneous detection such that the display device detects a total value of a detection result based on vibrations of a vehicle and a detection result based on the pressing operation by a person. Therefore, in the display device according to the present embodiment, a noise is cut by a blocking filter that attenuates a frequency band caused by vibrations of the vehicle.

A specific method of noise cutting is explained below with reference to FIG. 1B. The horizontal axis shown in FIG. 1B represents a frequency and the vertical axis represents a level value. As shown in FIG. 1B, a pressure value detected by a pressing operation by a person has a tendency of being distributed to a frequency lower than a pressure value detected by an effect of vibrations of a vehicle.

Therefore, in the display device according to the present embodiment, respective pressure values are developed to a frequency axis, and a noise of each of developed frequency components is cut by an LPF (Low pass filter) that attenuates a frequency band higher than a predetermined threshold (hereinafter, "cut-off frequency").

The technique of noise cutting is not limited to that using an LPF, and it is also possible to cut the noise, by a band-pass filter that attenuates a bandwidth out of a frequency within a required range.

Furthermore, the display device according to the present embodiment cuts an effect of vibrations of a vehicle based on a pressure value before being developed to a frequency axis. FIG. 1C is a graph of pressure values detected by respective pressure sensors. In FIG. 1C, the horizontal axis represents a time and the vertical axis represents a pressure value. The solid line graph in FIG. 1C represents a case of a pressing operation by a person and the wavy line graph in FIG. 1C represent a case of an effect of vibrations of a vehicle.

A continued time (t1) of a pressure value due to a pressing operation by a person tends to be longer as compared to a continued time (t2) of a pressure value due to vibrations of a vehicle. The reason for this tendency is that, in the case of a pressing operation by a person, pressing on a display is continued from the time of pressing a certain position on the display until a response is issued from the display device, such as until a sound of "beep" is issued.

Furthermore, as shown in FIG. 1C, the peak of a pressure value due to vibrations of a vehicle becomes a much higher value as compared to that due to a pressing operation by a person in some cases. Conversely, the peak of the pressure value due to vibrations of a vehicle becomes a very low value.

Based on such characteristics, when the continued time is shorter than a predetermined threshold, or when the pressure value is higher than a predetermined upper-limit threshold or is lower than a predetermined lower-limit threshold, the display device according to the present embodiment determines that the pressing operation is not that performed by a person. Accordingly, when the pressing operation is not that performed by a person, the display device according to the present embodiment is not supposed to calculate a pressed position based on the pressure value.

As described above, the display device according to the present embodiment eliminates the effect of vibrations of a vehicle and extracts only pressure values of pressing operations by a person. With this configuration, the display device according to the present embodiment can prevent erroneous detections of a pressing operation caused by vibrations of a vehicle as well as erroneous detections of a pressed position.

Meanwhile, the display device incorporated in a vehicle may make an erroneous detection of a pressed position because of not only an effect of vibrations of a vehicle but also because of an effect of sensing the vehicle speed and acceleration by a pressure sensor. Therefore, in the display device according to the present embodiment, at the time of noise cutting, a cutoff frequency can be changed according to the state of the vehicle such as the speed and acceleration thereof. Details of changing a cutoff frequency is described later with reference to FIGS. 3A to 5.

In the following descriptions, modes of the display device according to the present embodiment explained with reference to FIG. 1 are explained in more detail. A configuration of the display device according to the present embodiment is explained first with reference to FIG. 2. FIG. 2 is a block diagram of a configuration of a display device 10 according to the present embodiment. Only constituent elements necessary for explaining characteristics of the display device 10 are shown in FIG. 2.

As shown in FIG. 2, the display device 10 according to the present embodiment includes a touch panel 11, a communication I/F (interface) 12, a vibration detecting unit 13, a vehicle speed sensor 14, a pressure sensor 15, a person detecting sensor 16, a display driving unit 17, a storage unit 18, and a control unit 19. The control unit 19 includes a road-information acquiring unit 19a, a vibration-state estimating unit 19b, a filter unit 19c, a pressed-position calculating unit 19d, and a pressed-position correcting unit 19e. The storage unit 18 stores vibration state information 18a and threshold information 18b.

The touch panel 11 is a pressure sensitive panel provided on a front face of the display device 10, and receives input operations by detecting pressing on the panel. The communication I/F 12 is constituted by a communication device that enables communications with other devices. The communication I/F 12 performs, for example, data transmission and reception between the display device 10 and a navigation device (not shown).

The vibration detecting unit 13 is a device that detects and measures the acceleration, angle, and angular velocity of a vehicle, and corresponds to, for example, an accelerometer such as a G-sensor or a gyroscopic sensor that detects the angle and angular velocity of a vehicle. The vibration detecting unit 13 notifies detected measurement values to the vibration-state estimating unit 19b.

As described above with reference to FIG. 1A, the pressure sensor 15 is provided at the four corners of a back face of the touch panel 11, and is a sensor that detects pressure value information including a pressure value when the touch panel 11 is pressed.

The pressure value information including a pressure value detected by the pressure sensor 15 is sent to the filter unit 19c in order to perform noise cutting. In this description, while only one pair of the pressure sensor 15 and the filter unit 19c is explained, each of the pressure sensors 15 provided at the four corners of the back face of the touch panel 11 is respectively connected to a separate filter unit 19c, and the four filter units 19c individually perform noise cutting. However, the display device 10 does not always need to be constituted by four pressure sensors 15 and four filter unit 19c, and for example, the display device 10 may include six pairs of these units.

The person detecting sensor 16 is provided near the touch panel 11, and is a device that detects a pressing operation by a person. For example, the person detecting sensor 16 can be an infrared sensor or an acoustic sensor, and can detect a pressing operation by a person based on an image captured by a camera. Furthermore, when the person detecting sensor 16 detects a pressing operation by a person, the fact is notified to the filter unit 19*c*.

The display driving unit 17 is a processor that transmits an instruction for causing the control unit 19 to display information related to operations corresponding to a pressed position of a pressing operation and to various functions on a TFT liquid crystal panel (not shown).

For example, when the display device 10 has a navigation function, the display driving unit 17 transmits an instruction for causing the control unit 19 to display operation buttons or the like with a map on the TFT liquid crystal panel, and when the display device 10 has an audio function, the display driving unit 17 transmits an instruction for causing the control unit 19 to display operation buttons such as a replay button and a stop button with song titles or the like on the TFT liquid crystal panel. Note that the panel having a display function is not limited to a TEST liquid crystal panel.

The storage unit 18 is constituted by a storage device such as a standby RAM (Random Access Memory) having storage contents held therein as power is supplied thereto from a battery even when its ignition switch is turned off, a non-volatile memory, and a hard disk drive.

The storage unit 18 stores information related to a vibration state of a vehicle estimated by the vibration-state estimating unit 19*b* as the vibration state information 18*a*. The vibration state information 18*a* is a level indicating the vibration state of a vehicle, and for example, the vibration state information 18*a* can be classified into three types such as "high", "middle", and "low", can be classified by numerical values, and can be subdivided even further.

Furthermore, the storage unit 18 stores, as the threshold information 18*b*, information related to a case of performing noise cutting based on a cutoff frequency and a pressure value used when noise cutting is performed by the filter unit 19*c*.

Details of the threshold information 18*b* are explained here with reference to FIGS. 3A and 3B. FIGS. 3A and 3B are an example of the threshold information 18*b*. First, as shown in FIG. 3A, the threshold information 18*b* includes a section of "vibration level" and a section of "cutoff frequency". The threshold information 18*b* is an aggregation of records while information constituted by these sections is regarded as one record.

The section of "vibration level" is a level of vibration state set in advance according to the speed and acceleration of a vehicle, and is associated with the vibration state information 18*a* estimated by the vibration-state estimating unit 19*b*. Alternatively, the section of "vibration level" can have a value same as that of the vibration state information 18*a*. The section of "cutoff frequency" is a frequency as a threshold at the time of performing noise cutting by an LPF.

The section of "cutoff frequency" is stored in the threshold information 18*b* while corresponding to the section of "vibration level". The filter unit 19*c* performs noise cutting by an LPF that attenuates a frequency band of a frequency higher than the "cutoff frequency" that corresponds to the section of "vibration level" according to a vibration state of a vehicle.

Furthermore, when noise cutting is performed based on a pressure value, as shown in FIG. 3B, the threshold information 18*b* is constituted to include a section of "continued time", a section of "upper-limit threshold", and a section of "lower-limit threshold" other than the sections described above.

The section of "continued time" is a threshold when noise cutting is performed based on a continued time of a pressing operation. The section of "upper-limit threshold" and the section of "lower-limit threshold" are an upper-limit value and a lower-limit value, respectively, at the time of performing noise cutting based on a pressure value included in pressure value information.

While it has been explained that each threshold is stored while corresponding to a vibration level, each threshold can be stored while corresponding to the speed and acceleration of a vehicle. Furthermore, while it has been explained that thresholds related to various noise cutting processes are included in the threshold information 18*b*, it is also possible to have a configuration in which pieces of threshold information are stored in a separate manner as a process regarding noise cutting by an LPF and that regarding noise cutting based on a pressure value are separated.

Referring back to FIG. 2, the explanation of the configuration of the display device 10 is continued. The control unit 19 performs overall control of the display device 10, and corresponds to a microcomputer of a panel, for example. The road-information acquiring unit 19*a* is a processor that performs a process of acquiring information related to a road on which a vehicle is running via the communication I/F 12.

Road information refers to information included in map information of a navigation device, such as road surface types like "highway", "mountain path", and "public road", inclination angles of a road, and R-values (curve radius) of a road.

Furthermore, the road-information acquiring unit 19*a* sends acquired road information to the vibration-state estimating unit 19*b*, and the vibration-state estimating unit 19*b* then estimates the vibration state of a vehicle based on the acquired road information.

The vibration-state estimating unit 19*b* is a processor that performs a process of estimating the vibration state of a vehicle based on the road information sent from the road-information acquiring unit 19*a*, the acceleration, angle, and angular velocity of the vehicle sent from the vibration detecting unit 13, and the vehicle speed sent from the vehicle speed sensor 14.

For example, when the road type included in the road information sent from the road-information acquiring unit 19*a* is "mountain path", the vibration-state estimating unit 19*b* determines that the road surface state is poor, and then estimates the level of the vibration state as "high".

On the other hand, when the road type is "highway", the vibration-state estimating unit 19*b* determines that the road surface state is good, and then estimates the level of the vibration state as "low". Furthermore, the vibration-state estimating unit 19*b* also performs a process of sending the estimated vibration state as the vibration state information 18*a* to the filter unit 19*c*.

In addition, the vibration-state estimating unit 19*b* can also estimate the vibration state of a vehicle by acquiring weather information from a navigation device or the like via the communication I/F 12 so as to take the road surface state due to snow and the effect of wind and rain into consideration.

The filter unit 19*c* is a processor that develops respective pressure values detected by the pressure sensors 15 to a frequency axis, and performs a process of noise cutting on the developed frequency components individually by an LPF that that attenuates a frequency band caused by vibrations of a vehicle.

At the time of the above process, the filter unit 19*c* acquires the threshold information 18*b* that corresponds to a vibration state estimated by the vibration-state estimating unit 19*b*, and performs noise cutting based on the cutoff frequency included in the acquired threshold information 18*b*. Furthermore, the filter unit 19*c* also performs a process of sending the frequency components that have been noise-cut by the method described above to the pressed-position calculating unit 19*d*.

The filter unit 19c can also employ noise cutting techniques other than that using an LPF. For example, the frequency band caused by vibrations of a vehicle can be attenuated by a band-pass filter.

Furthermore, it is possible to configure that the display device 10 stores frequency components caused by vibrations of a vehicle in the storage unit 18 in advance. Subsequently, it is possible to configure that the filter unit 19c develops a pressure value detected by the pressure sensor 15 to a frequency axis, thereby performing noise cutting by subtracting the frequency components stored in the storage unit 18 from the developed frequency components. Further, it is also possible to configure that the storage unit 18 stores frequency components caused by vibrations of a vehicle for each vibration state individually so as to decide the frequency component to be subtracted based on the vibration state.

Moreover, the filter unit 19c can perform noise cutting based on a pressure value simultaneously with noise cutting by the LPF mentioned above. Details of a process of noise cutting performed by the filter unit 19c are explained below with reference to FIGS. 4A and 4B, and FIGS. 5A to 5C.

Figure 4A:
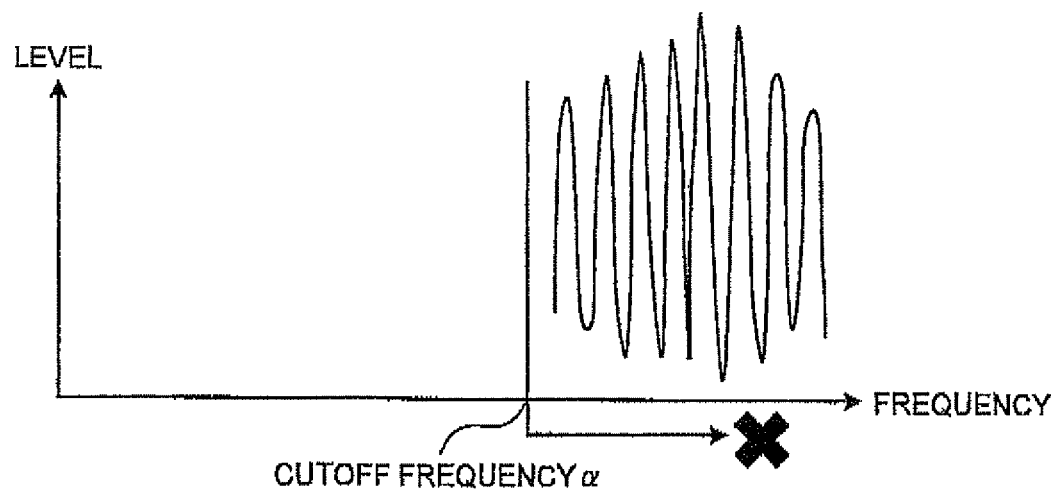
FIGS. 4A and 4B are explanatory diagrams of an LPF.
Figure 4B:
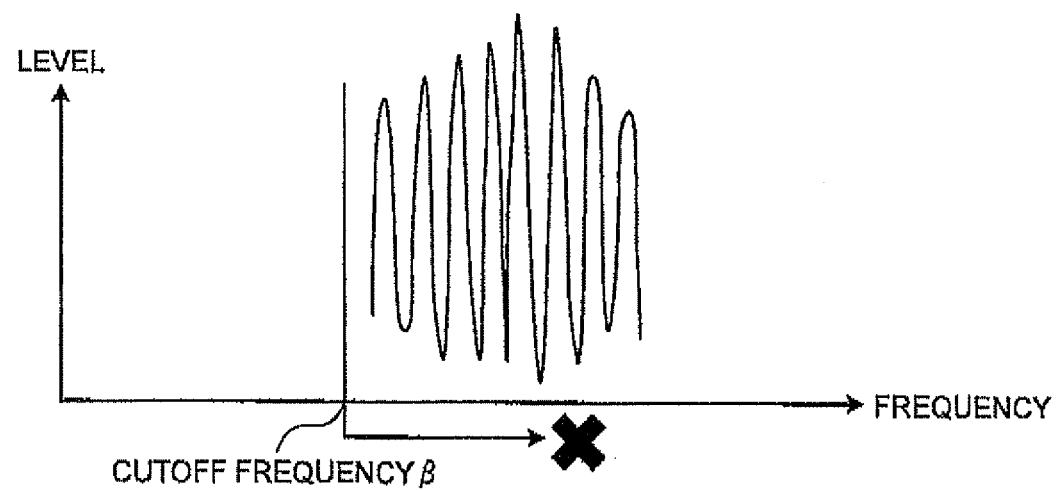

FIGS. 4A and 4B are explanatory diagrams of an LPF. FIGS. 4A and 4B are graphs of developed frequency components, in which a detected pressure value due to vibrations of a vehicle is developed to a frequency axis. In FIGS. 4A and 4B, the horizontal axis represents a frequency and the vertical axis represents a predetermined level value. FIG. 4A is a graph representing a case of a frequency component of a vehicle with a vehicle speed higher than that of the case shown in FIG. 4B.

When the vehicle speed is high (FIG. 4A), as compared to the case of a lower vehicle speed (FIG. 4B), the frequency tends to be distributed to a higher range. Accordingly, as shown in FIG. 4A, the filter unit 19c performs noise cutting by a cutoff frequency $\alpha$, which is higher than a cutoff frequency $\beta$.

In this manner, the display device 10 can eliminate the effect of vibrations of a vehicle accurately by performing noise cutting with a cutoff frequency that corresponds to a vibration state varied by the speed and acceleration or the like of the vehicle.

While it has been explained that the display device 10 performs noise cutting by attenuating a frequency band higher than a cutoff frequency, it is also possible to perform noise cutting by attenuating the level of frequency components.

Figure 5A:
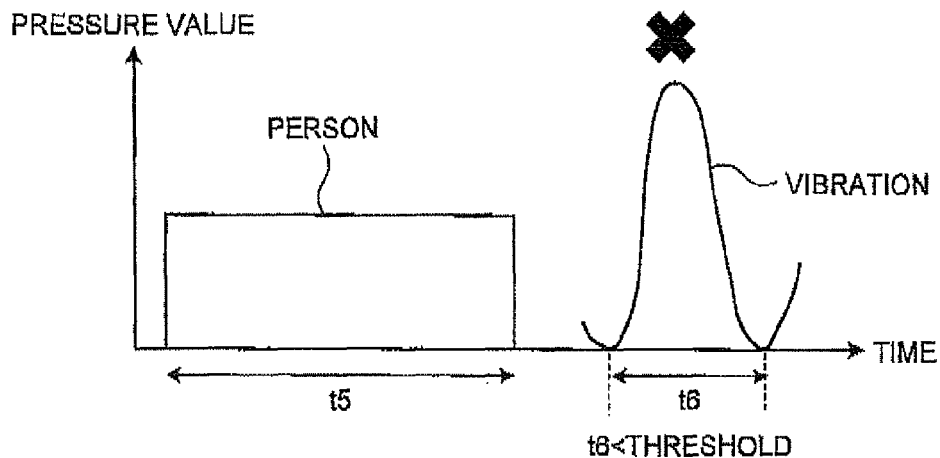
FIGS. 5A to 5C are explanatory diagrams of a noise cutting process based on a pressure value.
Figure 5B:
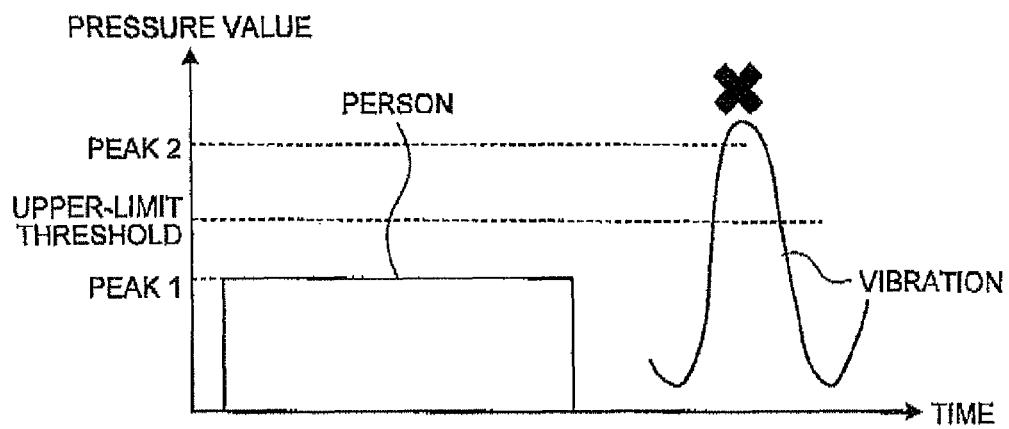
Figure 5C:
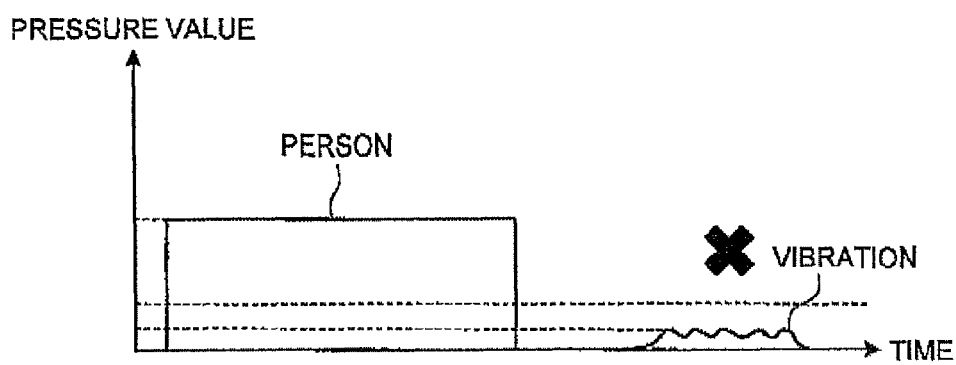

A noise cutting process based on a pressure value performed by the filter unit 19c is explained next in detail with reference to FIGS. 5A to 5C. FIGS. 5A to 5C are explanatory diagrams of a noise cutting process based on a pressure value.

FIGS. 5A to 5C are also graphs in which a pressure value due to a pressing operation by a person and a pressure value due to vibrations of a vehicle are compared. In FIGS. 5A to 5C, the horizontal axis represents a time and the vertical axis represents a pressure value.

As shown in FIG. 5A, a continued time (t6) of a pressure value due to vibrations of a vehicle tends to be shorter than a continued time (t5) of a pressing operation by a person. Therefore, when the continued time is shorter than a predetermined threshold, the filter unit 19c determines that pressing is caused by an effect of vibrations of a vehicle, eliminates the pressure value, and then performs noise cutting.

However, when the speed of the vehicle is high, there is a case where it is difficult for an operator to keep pressing the same pressed position. Furthermore, when the acceleration of the vehicle is large, such as the time of sudden starting, a finger of the operator may fail to keep contacting on the pressed position, and the continued time may be shortened.

Therefore, even if the continued time is shorter than a predetermined threshold, when the speed of the vehicle is faster than a predetermined speed or the acceleration thereof is higher than a predetermined value, there is a possibly that the pressure value is due to a pressing operation by a person. Accordingly, in this case, the filter unit 19c does not regard the pressure value as a pressure value detected due to an effect of vibrations of a vehicle, and thus noise cutting is not performed.

Furthermore, as shown in FIGS. 5B and 5C, there may be a case where, as a peak value (a peak 2) of a pressure value due to vibrations of a vehicle is compared to a peak value (a peak 1) of a pressure value due to a pressing operation by a person, the peak 2 becomes a value much higher than that of the peak 1, and also a case of detecting a peak value (a peak 3) of a pressure value, which is too small to be caused by a pressing operation by a person.

Therefore, when the peak value of a pressure value is higher than a predetermined upper-limit threshold or is lower than a predetermined lower-limit threshold, the filter unit 19c regards the pressure value as a pressure value detected due to an effect of vibrations of a vehicle, and then noise cutting is performed while eliminating the pressure value.

When noise cutting is performed, the filter unit 19c acquires the threshold information 18b that corresponds to a vibration state estimated by the vibration-state estimating unit 19b, and uses the threshold, upper-limit threshold, and lower-limit threshold of the continued time included in the acquired threshold information 18b.

The filter unit 19c performs a noise cutting process as described above. However, when it is estimated by the vibration-state estimating unit 19b that a vehicle is stopped, the display device hardly receives an effect due to vibrations of the vehicle. It is possible to configure that the filter unit 19c does not perform noise cutting in such a case.

Referring back to FIG. 2, the explanation of the configuration of the display device 10 is continued. The pressed-position calculating unit 19d is a processor that performs a process of calculating a pressed position based on respective frequency components that have been noise-cut by four filter units 19c.

Because the calculating technique of a pressed position by respective frequency components is a well-known technique, explanations thereof are omitted here. Furthermore, the pressed-position calculating unit 19d also performs a process of sending the calculated pressed position to the pressed-position correcting unit 19e.

The pressed-position correcting unit 19e is a processor that performs a process of correcting a pressed position calculated by the pressed-position calculating unit 19d. A pressed-position correcting process performed by the pressed-position correcting unit 19e is explained below in detail with reference to FIGS. 6A to 6C.

Figure 6A:
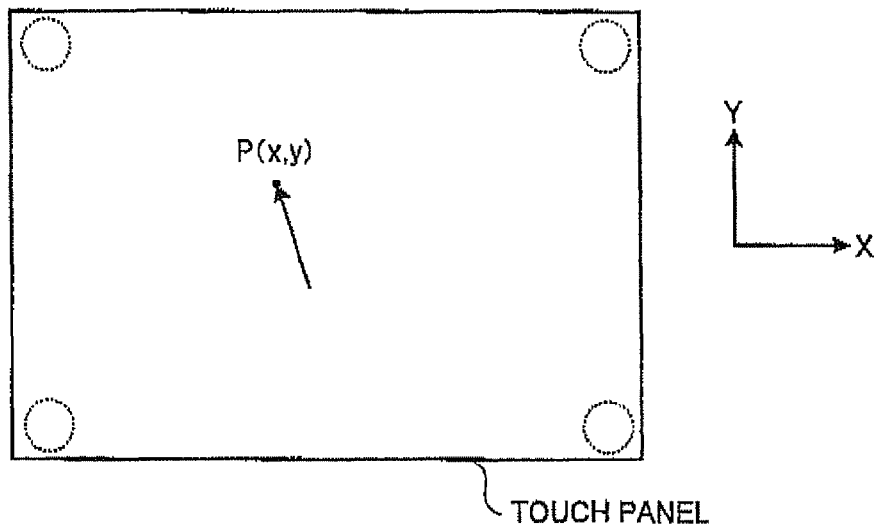
FIGS. 6A to 6C are explanatory diagrams of a pressed-position correcting process.
Figure 6B:
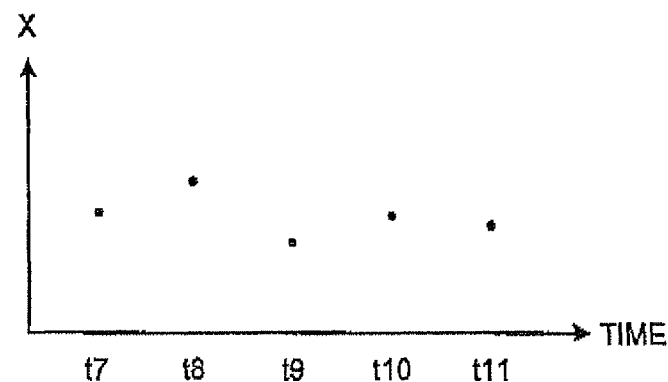
Figure 6C:
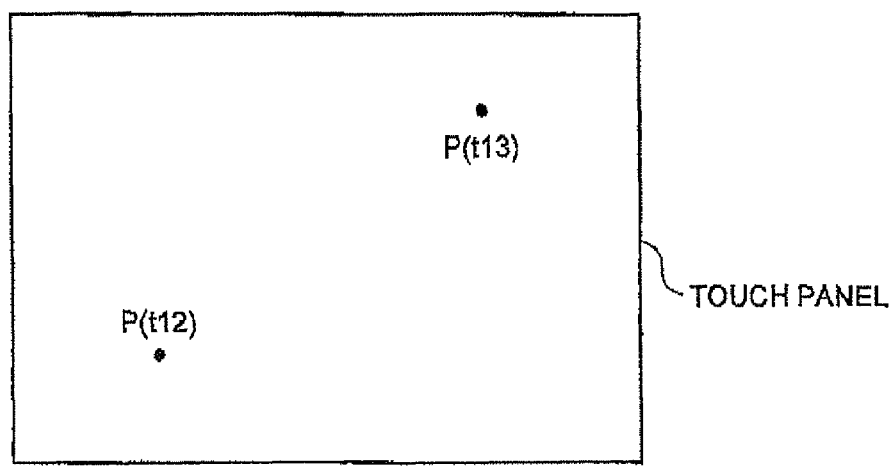

FIGS. 6A to 6C are explanatory diagrams of a pressed-position correcting process. A case where a predetermined position on the touch panel 11 is pressed by an operator is explained first with reference to FIGS. 6A and 6B. In the following descriptions, the pressed-position correcting process is explained while referring to the coordinate axes shown on the right side of FIG. 6A.

As shown in FIG. 6A, when a position P indicated by a coordinated value (x, y) on the touch panel 11 is pressed, the pressure sensor 15 continuously detects pressure values during a continued time of a pressing operation. The pressed-position calculating unit 19*d* then calculates the pressed position at each period of time based on the continuously detected pressure values.

Specifically, FIG. 6B is a graph of X-coordinate values of the pressed positions that are calculated based on the continuously detected pressure values and expanded on the time axis. In FIG. 6B, the horizontal axis represents a time and the vertical axis represents an X-coordinate value.

As shown in FIG. 6B, at a time t7 to a time t11, the X-coordinate values calculated by the pressed-position calculating unit 19*d* have variations in the numerical values thereof. Therefore, the pressed-position correcting unit 19*e* corrects pressed positions calculated based on the continuously detected pressure values such that values smoothed within a predetermined time are set to be the pressed positions.

As the correcting technique, it is possible to employ smoothing according to a moving average or obtaining an average value of coordinate values within a predetermined time. While X-coordinate values are explained in this description, the same holds true for Y-coordinate values.

Furthermore, the control unit 19 invalidates a detected pressure value when the continued time of a pressing operation is shorter than a predetermined threshold. Further, it is also possible to configure that, by changing a threshold based on a vibration state acquired by the vibration state information 18*a*, the pressed-position correcting unit 19*e* determines whether it is a pressing operation by a person. For example, when the speed of a vehicle is faster than a predetermined speed or the acceleration thereof is higher than a predetermined value, the pressed-position correcting unit 19*e* sets the threshold to be short.

Subsequently, when a coordinate value indicating that separate positions are pressed within a predetermined time is calculated by the pressed-position calculating unit 19*d*, the pressed-position correcting unit 19*e* invalidates the coordinate value. Specifically, as shown in FIG. 6C, as for continuous times t12 and t13, it is assumed that coordinate values of these times calculated by the pressed-position calculating unit 19*d* are P (t12) and P (t13), respectively. In this case, the pressed-position correcting unit 19*e* makes a correction such that any one of the coordinate values of the P (t12) or the P (t13) is invalidated.

In this manner, the pressed-position correcting unit 19*e* corrects a pressed position calculated by the pressed-position calculating unit 19*d*. With this configuration, the display device 10 can accurately calculate pressed positions. As for the correction technique, it is not limited to the technique described above, and the correction can be made by other techniques.

A control process performed by the display device 10 according to the present embodiment is described below in detail with reference to FIG. 7 and FIG. 8. FIG. 7 is a flowchart of an outline of a vibration-state-estimation process procedure, and FIG. 8 is a flowchart of an outline of a pressed-position-calculation process procedure.

First, in the control unit 19, a vibration state of a vehicle is estimated as follows. As shown in FIG. 7, the road-information acquiring unit 19*a* acquires information related to a road on which a vehicle is running (Step S101).

Subsequently, the vibration-state estimating unit 19*b* acquires information related to vibrations, such as the acceleration, angle, and angular velocity of the vehicle from the vibration detecting unit 13 (Step S102), and then acquires a vehicle speed from the vehicle speed sensor 14 (Step S103).

Next, the vibration-state estimating unit 19*b* estimates a vibration state based on the acquired road information, vibration information, and vehicle speed (Step S104), updates the vibration state information 18*a* by reflecting the estimated vibration state (Step S105), and then a series of a vibration-state estimating process performed by the control unit 19 is finished.

Next, the pressed-position-calculation process procedure performed by the control unit 19 is explained in detail with reference to FIG. 8. As shown in FIG. 8, four filter units 19*c* respectively acquire a pressure value from four pressure sensors (Step S201).

Next, the filter unit 19*c* acquires the vibration state information 18*a* (Step S202), and then acquires the threshold information 18*b* associated with a vibration level corresponding to the acquired vibration state information 18*a* (Step S203).

Subsequently, the filter unit 19*c* performs noise cutting while eliminating the effect of vibrations of a vehicle from respective pressure values acquired at Step S201 based on the acquired threshold information lab (Step S204).

Thereafter, the pressed-position calculating unit 19*d* calculates a pressed position based on the respective pressure values that have been noise-cut by the filter unit 19*c* (Step S205). Subsequently, the pressed-position correcting unit 19*e* corrects the pressed position calculated by the pressed-position calculating unit 19*d* (Step S206), and then a series a pressed-position calculating process performed by the control unit 19 is finished.

It is also possible to configure that the control unit 19 performs a series of the pressed-position calculating process described above only when receiving information indicating that it is a pressing operation by a person from the person detecting sensor 16. With this configuration, elimination of the effect due to vibrations of a vehicle can be made, thereby extracting only pressure values of pressing operations of a person.

In this case, when the display device 10 has a navigation function, contents of operation buttons are transmitted to a navigation device (not shown) along with a pressed position calculated by the control unit 19, and the navigation device transmits information corresponding to the pressed position, such as map information and route information, to the display device 10. Thereafter, the display device 10 displays the map information, route information or the like transmitted from the navigation device on a TFT liquid crystal panel.

In this manner, the display device 10 according to the present embodiment can be applied as the display device 10 of a navigation device having a navigation function, and can be also applied as the display device 10 of an audio device that replays CDs and DVDs or of a television reception device.

As described above, the display device according to the present embodiment develops respective pressure values detected by a plurality of pressure sensors provided on the four corners of a back face of a pressure sensitive touch panel to a frequency axis, and attenuates a frequency band caused by vibrations of a vehicle, thereby cutting a noise. Furthermore, because a pressed position is calculated based on respective pressure values that have been noise-cut, even when the display device is incorporated in a vehicle, it is possible to prevent erroneous detections of a pressing operation caused by vibrations of the vehicle as well as erroneous detections of a pressed position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A display device incorporated in a vehicle, comprising:
a touch panel that receives a pressing operation;
a plurality of detecting units that detect pressure values on the touch panel;
a storage unit that stores a vibration level indicating a vibration state of the vehicle, the vibration level being classified in advance according to a speed or an acceleration of the vehicle;
a blocking unit that blocks a frequency band of the pressure values detected by the detecting unit, the pressure values corresponding to the vibration state of the vehicle and based on the vibration level indicating the vibration state of the vehicle, the vibration level being classified in advance according to the speed or the acceleration of the vehicle; and
a calculating unit that calculates a pressed position based on a result of blocking by the blocking unit.

2. The display device according to claim 1, further comprising a vibration estimating unit that estimates the vibration state of the vehicle by classifying the vibration state of the vehicle by the vibration level, wherein
the blocking unit changes the frequency band based on the vibration state of the vehicle estimated by the vibration estimating unit.

3. The display device according to claim 2, further comprising a map-information acquiring unit that acquires map information including information related to a state of a road, wherein
the vibration estimating unit estimates the vibration state based on the map information acquired by the map-information acquiring unit.

4. The display device according to claim 3, further comprising a pressed-position correcting unit that corrects the pressed position calculated by the calculating unit based on the vibration state estimated by the vibration estimating unit.

5. The display device according to claim 3, wherein the calculating unit does not calculate the pressed position when a continued time indicating that a time when a pressure value detected by the detecting unit is continuously larger than a lower-limit threshold is shorter than a predetermined threshold, or when the pressure value is not within a predetermined range.

6. The display device according to claim 2, further comprising a pressed-position correcting unit that corrects the pressed position calculated by the calculating unit based on the vibration state estimated by the vibration estimating unit.

7. The display device according to claim 6, wherein the calculating unit does not calculate the pressed position when a continued time indicating that a time when a pressure value detected by the detecting unit is continuously larger than a lower-limit threshold is shorter than a predetermined threshold, or when the pressure value is not within a predetermined range.

8. The display device according to claim 2, wherein the calculating unit does not calculate the pressed position when a continued time indicating that a time when a pressure value detected by the detecting unit is continuously larger than a lower-limit threshold is shorter than a predetermined threshold, or when the pressure value is not within a predetermined range.

9. The display device according to claim 2, wherein the blocking unit does not block the frequency band when the vibration estimating unit estimates that the vehicle is stopped.

10. The display device according to claim 1, wherein the calculating unit does not calculate the pressed position when a continued time indicating that a time when a pressure value detected by the detecting unit is continuously larger than a lower-limit threshold is shorter than a predetermined threshold, or when the pressure value is not within a predetermined range.

11. The display device according to claim 1, further comprising a pressing-operation detecting unit that detects whether the pressing operation is received, wherein
the calculating unit calculates the pressed position when a fact that the pressing operation is received has been detected by the pressing-operation detecting unit.

12. The display device according to claim 1, further comprising a person detecting unit that detects a pressing operation by a person, wherein the calculating unit calculates the pressed position when the pressing operation by a person is detected by the person detecting unit.

13. A display device incorporated in a vehicle, comprising:
a touch panel that receives a pressing operation;
a plurality of detecting means for detecting pressure values on the touch panel;
a storage means for storing a vibration level indicating a vibration state of the vehicle, the vibration level being classified in advance according to the seed or an acceleration of the vehicle;
a blocking means for blocking a frequency band of the pressure values detected by the detecting means, the pressure values corresponding to the vibration state of the vehicle, based on the vibration level indicating the vibration state of the vehicle, the vibration level being classified in advance according to the speed or the acceleration of the vehicle; and
a calculating means for calculating a pressed position based on a result of blocking by the blocking means.

14. A display device incorporated in a vehicle, comprising:
a touch panel that receives a pressing operation;
a plurality of detecting units that detect pressure values on the touch panel;
a blocking unit that blocks a frequency band of the pressure values detected by the detecting unit, the pressure values corresponding to a vibration state of the vehicle and based on a vibration level indicating the vibration state of the vehicle, the vibration level being set in advance;
a calculating unit that calculates a pressed position based on a result of blocking by the blocking unit; and
a storage unit storing a plurality of frequency components caused by vibrations of the vehicle corresponding to each vibration state of the vehicle, wherein the blocking unit decides a frequency component to be blocked based on the vibration state of the vehicle.

* * * * *